United States Patent [19]

Bengoa et al.

[11] Patent Number: 5,711,534
[45] Date of Patent: Jan. 27, 1998

[54] ANNULAR SHAFT SEAL HAVING AN ELASTIC SEALING LIP

[75] Inventors: Jesus Bengoa, Durango/Vizcaya, Spain; Gerd Upper, Hoisdorf, Germany

[73] Assignee: Dichtungstechnik G. Bruss GmbH & Co. KG, Hoisdorf/Hamberg, Germany

[21] Appl. No.: 569,330

[22] Filed: Dec. 6, 1995

[30] Foreign Application Priority Data

Dec. 6, 1994 [DE] Germany .............. 44 43 422.7

[51] Int. Cl.$^6$ ................................ F16J 15/32
[52] U.S. Cl. ........................ 277/134; 277/153
[58] Field of Search ..................... 277/134, 153

[56] References Cited

U.S. PATENT DOCUMENTS

| | | | |
|---|---|---|---|
| 3,640,542 | 2/1972 | Mowat et al. | 277/134 |
| 3,838,862 | 10/1974 | Fern . | |
| 3,921,992 | 11/1975 | Bertin | 277/237 R |
| 3,929,340 | 12/1975 | Peisker | 277/134 |
| 4,399,998 | 8/1983 | Otto . | |
| 5,190,299 | 3/1993 | Johnston | 277/152 |
| 5,462,287 | 10/1995 | Hering et al. | 277/134 |

FOREIGN PATENT DOCUMENTS

| | | |
|---|---|---|
| 2306775 | 8/1973 | Germany . |
| 2350630 | 5/1974 | Germany . |
| 2757523 | 6/1978 | Germany . |
| 2843401 | 4/1980 | Germany . |
| 2206461 | 11/1983 | Germany . |
| 3830706 | 3/1990 | Germany . |

OTHER PUBLICATIONS

Ted Holland "Seals for Rotating Shafts" *Engineering*, Jul./Aug. 1973 pp.555–553.

"A New Generation of Radial Shaft Seal Rings" *Antriebstechnik*, 12 1973 Nr. 10 p.304.

*Primary Examiner*—William A. Cuchlinski, Jr.
*Assistant Examiner*—Christina Annick
*Attorney, Agent, or Firm*—Lawrence J. Shurupoff

[57] ABSTRACT

An annular shaft seal includes an elastic sealing lip which carries a twist element at its contact surface at the side exposed to air. The twist element is designed to return any liquid which may have exited to the air side back to the liquid side of the seal over the sealing edge, with both directions of rotation of the shaft. At least two sinusoidal twist ribs having the same amplitude and phase are shifted in phase position and bear snugly and tangentially against the sealing edge.

6 Claims, 2 Drawing Sheets

FIG 3
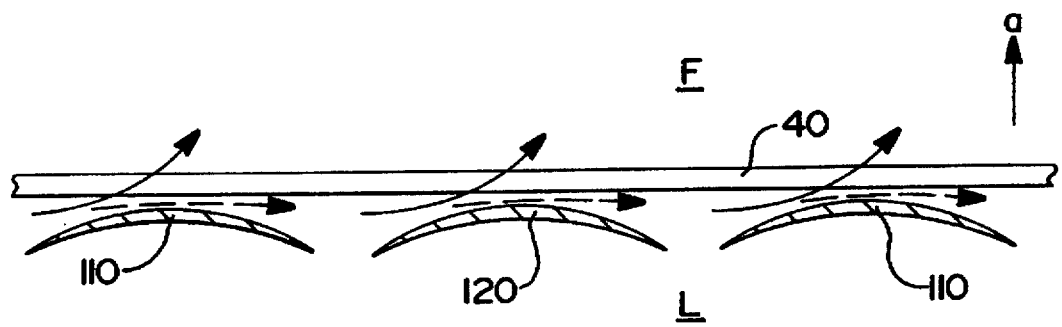
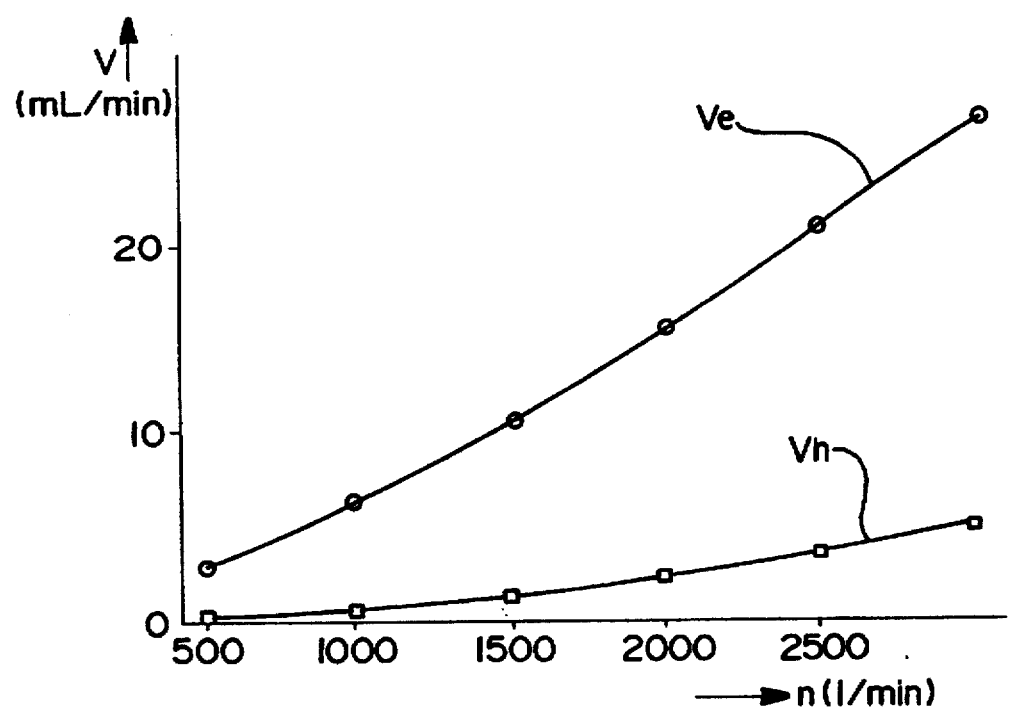
FIG 4

ANNULAR SHAFT SEAL HAVING AN ELASTIC SEALING LIP

FIELD OF THE INVENTION

The instant invention relates to an annular shaft seal comprising an elastic sealing lip which carries a twist element at its contact surface at the side exposed to air, designed to return any liquid which may have exited to the air side back to the liquid side of the seal over the sealing edge, with both directions of rotation of the shaft.

DESCRIPTION OF PRIOR DEVELOPMENTS

A shaft sealing ring of the kind in question is known from DE 29 45 853 A1 where rectilinear twist ribs are arranged in pairs in mirror symmetry at the contact surface of the side exposed to air. This arrangement is made in a way so that any fluid which passed below the sealing edge of the sealing lip will be returned across the sealing edge to the liquid side, regardless of the direction of rotation of the shaft. The twist ribs are disposed at an acute angle smaller than 30° with respect to the sealing edge. The tips of each pair of opposed twist ribs, at the side of the sealing edge, meet at the sealing edge.

Where conditions of installation are such that the shaft to be sealed off has a principal direction of rotation, a further development of such an annular shaft seal disclosed in DE 37 02 018 is designed such that those twist ribs of each rib pair which are disposed in the same direction are longer than the other twist ribs of each pair of twist ribs.

It is known from DE 22 06 461 C2 to provide a continuous twist rib of zig-zag shape and having rounded tips on the contact surface of the sealing lip of an annular shaft seal at the side exposed to air, maintaining an axial distance from the sealing edge.

Finally, annular shaft seals including a sealing lip are known in which ribs interconnected in a diamond pattern are formed at the contact surface facing air. The tips of these ribs meet at the sealing edge (DE 25 56 992 B1).

The known annular shaft seals including the pairs of twist ribs oriented in opposite directions each act on the "active" twist ribs in the manner of windshield wipers which wipe back across the sealing edge the medium which should be sealed off but was taken along by the shaft movement to the air side, this medium usually being oil. That creates a pressure head by which the major part of the oil is conveyed back over the sealing edge to the oil side. A smaller portion of the oil, however, is pushed under and past the active twist rib, getting to the backside remote from the catch area of the opposed inclined twist rib of the twist rib pair. This in turn wipes the oil farther towards the air side, i.e. away from the sealing edge so that this smaller share of oil is lost as leakage.

SUMMARY OF THE INVENTION

It is the object of the invention to provide an annular shaft seal with which practically no leak oil gets lost.

This object is met, in accordance with the invention, by the provision of at least two twist ribs curved sinusoidally and having the same amplitude and phase, but being shifted in phase, bearing snugly in tangential direction against the sealing edge.

The sinusoidally curved twist ribs according to the invention merely cling tangentially to the contact zone of the sealing edge without penetrating the same. Surprisingly, this results in much better returning of the liquid (oil) which has passed the sealing edge towards the side exposed to air than is obtainable with the prior art. Consequently, the amount of leak oil can be minimized.

In an advantageous modification of the invention, the twist rib(s) has/have an angular inclination with respect to the shaft surface of between 0° and −15°, especially between 0° and −5° in areas adjacent the sealing edge, as seen in axial section. With this embodiment the areas of the twist rib(s) remote from the sealing edge thus have an inner diameter smaller than the outer diameter of the shaft, whereby the pressure acting on the sealing edge of the sealing lip is less than the pressure to which the zones of the twist rib remote from the sealing edge are subjected. This prevents leak oil from getting by below the active portions of the twist ribs as happens with the known structures. Therefore, this also contributes to improving the effect of conveying back leak oil and minimizing the quantity of leak oil lost.

According to another modification of the invention the twist rib(s), in axial section, may have an angular inclination with respect to the contact surface of the sealing lip of between 0° and −10°, especially 0° and −3°, in areas remote from the sealing edge. In this manner it is possible to enlarge the catch cross sections if shafts are revolving out of true or if the sealing edge of the sealing lip is not precisely centric.

BRIEF DESCRIPTION OF THE DRAWING

The invention will be described further, by way of example, with reference to the accompanying drawings, in which:

FIG. 3 presents a development in circumferential direction of the region of the sealing edge intended to explain the mode of operation of the annular shaft seal according to the invention; and FIG. 4 is a diagram showing the capability of return conveyance of a conventional sealing ring with twist ribs and an annular shaft seal according to the invention.

DESCRIPTION OF THE PREFERRED EMBODIMENT

Figure 1:
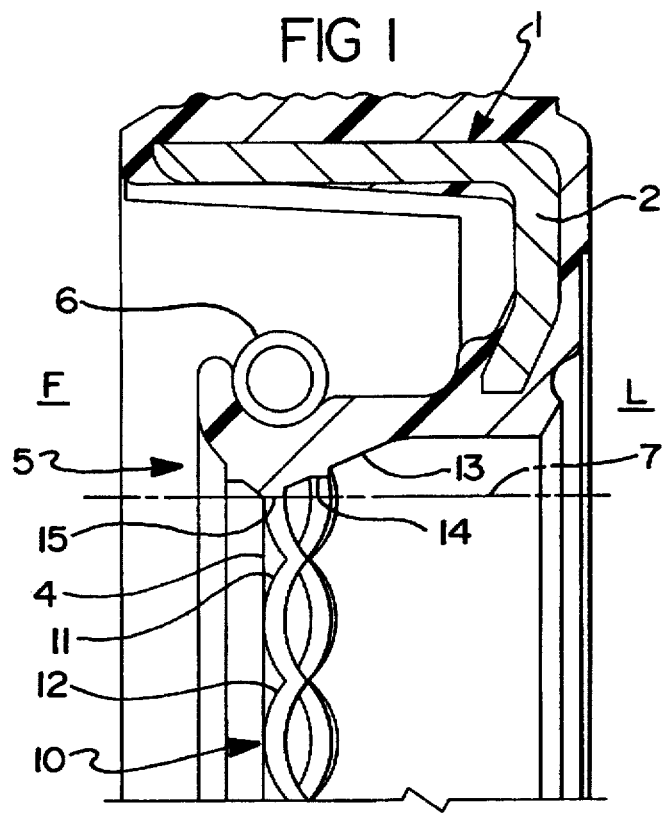
FIG. 1 illustrates an annular shaft seal with twist ribs according to the invention in semi-section.

The annular shaft seal illustrated in FIG. 1 comprises a metallic insert 1 having a short L-limb 2 which is oriented in radial direction and to which a sealing lip 5 including a sealing edge 4 is attached by vulcanization. The sealing lip 5 is pressed in conventional manner by means of a worm spring 6 against the surface 7 of the shaft.

The side of the seal exposed to air is designated by letter L, while the side exposed to oil is marked F.

At the oil side, a continuous twist element is shown in the form of a braid 10 made up of two axially and radially extending twist ribs 11, 12 which are superposed in sine fashion at a phase of 180°, the crests of the waves being in close contact with the sealing edge 4. As may be seen in the cross sectional view of FIG. 1, the twist ribs 11, 12 project radially from the sealing lip 5, more specifically from the contact surface 13 thereof at the side exposed to air. In the presentation of FIG. 1 those surfaces 14, 15 of the twist ribs 11, 12 which face the shaft extend parallel to the axis. This means that the surface 15 subtends an angle of 0° with the shaft surface 7, in other words it is pressed uniformly against the shaft along its entire axial length. Also the angle at the surface 14 is 0°.

Figure 2:
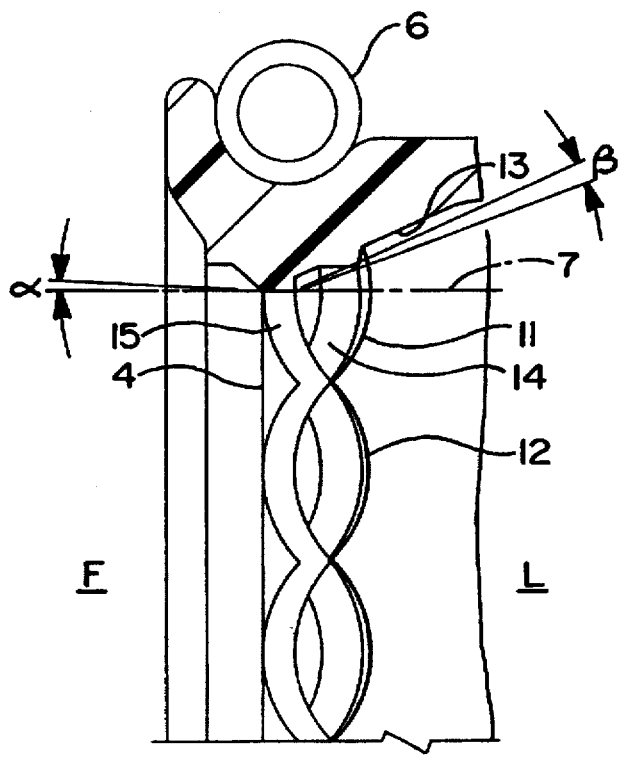
FIG. 2 is a sectional view similar to FIG. 1, showing a sealing lip with the twist ribs according to the invention on an enlarged scale.

FIG. 2, from which the outer part of the annular shaft seal has been omitted for the sake of clarity and in which the same reference numerals are used as in FIG. 1, illustrates two modifications which may be made either alone or together to the annular shaft seal shown in FIG. 1. Here, the surfaces 14 and 15 of the twist ribs 11 and 12 each are inclined at a negative angle α and β, respectively. Angle α is approximately −2° with respect to the shaft surface 7, and angle β is approximately −3° with respect to a plane that is approximately parallel to the contact surface 13 of the sealing lip 5.

By virtue of the negative inclination of the surface 15 this surface is being pressed more firmly against the shaft surface 7 as the distance increases from the sealing edge 4 towards the side exposed to air L. This makes it more difficult for leak oil to reach an inactive portion of the respective other twist rib.

The angle α may measure up to −15°. A preferred range of angle α lies between 0 and −5°. The result obtained from the inclination β of the surface 14 of the twist rib 11 is that the catch cross sections of the twist ribs 11, 12 increase in areas more remote from the sealing edge 4 if the shaft should revolve out of true (wobbling shaft) or in case of a static center displacement of the shaft and the bore of the housing.

Both measures thus contribute to improving the returning action of the twist element 10.

It is clear from the presentations of FIGS. 1 and 2 that the twist ribs 11, 12 do not extend obliquely into the sealing edge 4. Instead, they merely bear snugly in tangential direction against the sealing edge 4 but need not necessarily contact the same. In this manner leak oil is caught by a relatively great cross section between the twist element 10 and the sealing edge 4 and conveyed into a narrowing channel in the vicinity of the sealing edge 4.

This is clearly illustrated in FIG. 3 which is a development in which a designates the axial direction and the shaft is assumed to be transparent.

The sickel-shaped portions 110, 120 represent the surface areas of the twist ribs 11, 12 pressed into contact with the transparent shaft, the sickel-shaped portions 110 being part of the twist rib 11 and the sickel-shaped portions 120 being part of the twist rib 12.

The continuous stripe 40 represents the surface area of the sealing edge 4 pressed against the shaft surface.

The full-line arrows illustrate how the active zones (in FIG. 3 the left regions) of the sickel-shaped portions 110, 120 convey leak oil back across the sealing edge area 40 to the side exposed to oil F. The arrows shown in discontinuous lines, on the other hand, refer to oil which is passing through the spacing between the sealing edge area 40 and the sickel-shaped portions 110, 120 in order to be returned by the next active zone over the sealing edge to the oil side F. Since the oild need not be strained underneath a solid sealing edge 4 it is not pressurized to the extent of the pressure head occurring with the known seals. It is merely the conveying effect of the microstructure of the surface of the annular shaft seal which is utilized for returning the oil across the sealing edge (sealing edge area 40) towards the side exposed to oil F.

It is relatively easy to manufacture the annular shaft seal on a copy turning lathe as the twist element 10 terminates on the diameter of the sealing edge 4. The parting depth to form the twist element 10 in the tool can be controlled optically in simple manner.

In FIG. 4 results of comparative tests are plotted which were carried out with annular shaft seals according to the invention and a covnentional sealing ring including the usual twist elements. In the figure, V refers to the flow of leak oil transported back across the sealing edge 4 in milliliters per minute and n (1/min). Vh designates the return volume flow V obtained with the conventional seal and Ve designates the return volume flow measured with the annular shaft seal according to the invention. The measurements were made with a transmission oil of viscosity class SAE 90° at 100° C.

As readily apparent, the annular shaft seal according to the invention proved to be clearly superior to the conventional sealing ring as regards the leak oil return conveyance capacity. In this context it is especially significant in practical terms that the annular shaft seal according to the invention demonstrated almost the same return transport capacity at a rotational speed n of 500 r.p.m. as the conventional sealing ring did at 2500 r.p.m.

Endurance testing following a test specification for the rear ends of crankshafts for internal combustion engines revealed that the annular shaft seals according to the invention were tight over 336 h at rotational speeds of up to 7000 r.p.m. and a shaft diameter of 85 mm. This means that an operating range can be accommodated which up to now required the use of shaft sealing rings including twist ribs which acted in only one direction of rotation of the shaft.

What is claimed is:

1. An annular shaft seal, comprising:
   a sealing lip comprising an air side surface, a liquid side surface, and an annular sealing edge located between said air side surface and said liquid side surface; and a twist element provided on said air side surface, said twist element comprising at least two sinusoidal axially and radially extending twist ribs shifted in phase and each disposed tangentially around said sealing edge on sad air side surface.

2. The annular shaft seal as claimed in claim 1, wherein the twist ribs extend continuously about the sealing edge of the annular shaft seal.

3. The annular shaft seal as claimed in claim 1, wherein the shift in phase is 180°.

4. The annular shaft seal as claimed in claim 1, wherein the twist ribs, in axial section, when mounted on a shaft surface, have an angular inclination with respect to the shaft surface of between 0° and −15° in areas adjacent the sealing edge.

5. The annular shaft seal as claimed in claim 1, wherein said air side surface comprises a contact surface and wherein the twist ribs, in axial section, have an angular inclination with respect to the contact surface of between 0° and −10° in areas remote from the sealing edge.

6. The annular shaft seal of claim 1, wherein said twist ribs have the same amplitude and phase.

* * * * *